Dec. 22, 1925.
G. J. HARMAN
1,566,597
HOSE NOZZLE FOR GASOLINE PUMPS
Filed Sept. 30, 1924
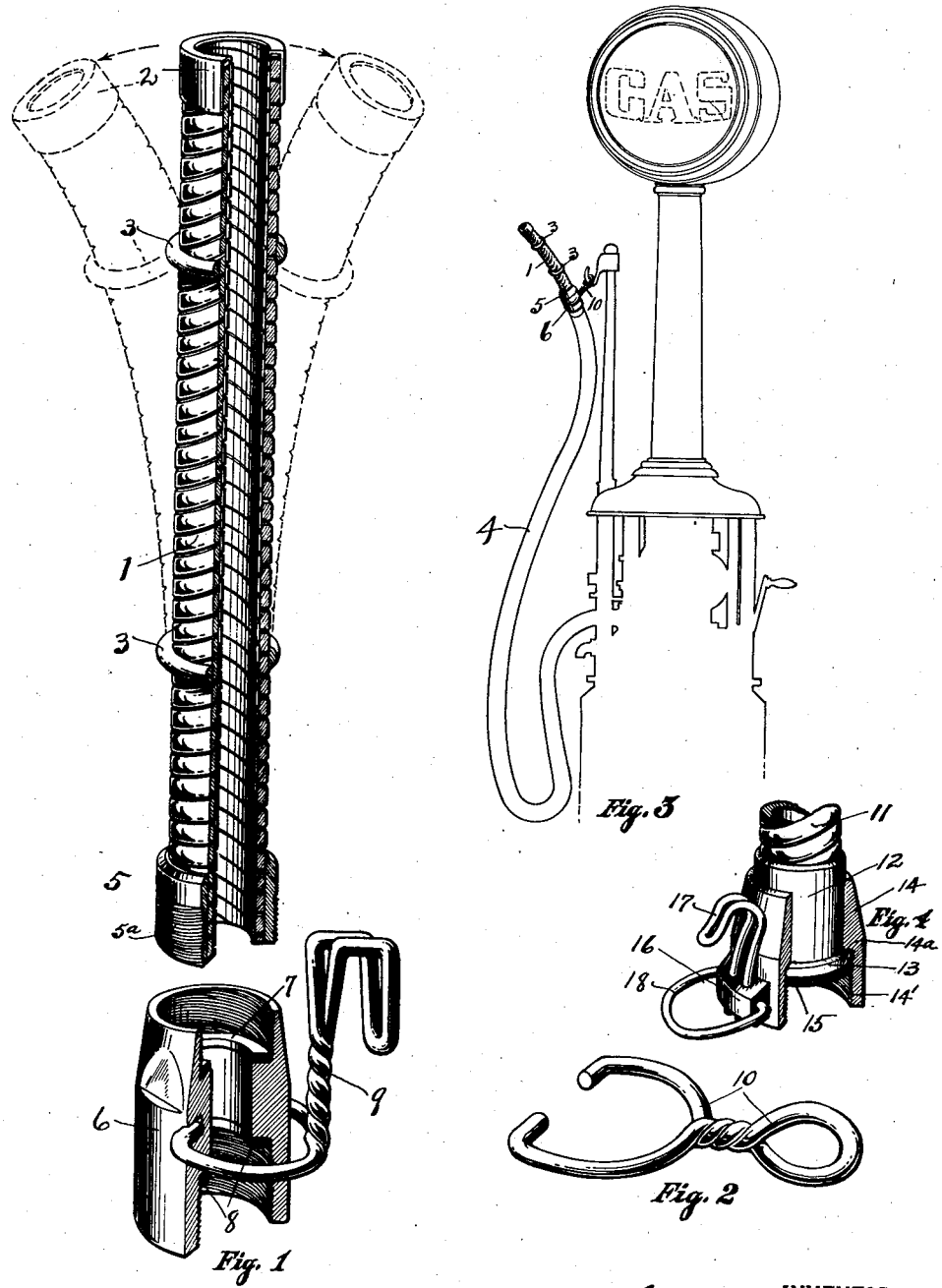
INVENTOR.
Gerald J. Harman
BY
ATTORNEY.

Patented Dec. 22, 1925.

1,566,597

UNITED STATES PATENT OFFICE.

GERALD J. HARMAN, OF LOS ANGELES, CALIFORNIA.

HOSE NOZZLE FOR GASOLINE PUMPS.

Application filed September 30, 1924. Serial No. 740,799.

*To all whom it may concern:*

Be it known that I, GERALD J. HARMAN, a citizen of the United States, and a resident of Los Angeles, Los Angeles County, California, have invented certain new and useful Improvements in Hose Nozzles for Gasoline Pumps, of which the following is a specification.

My invention relates more particularly to that type of hose nozzles used on gasoline pumps in service stations for discharging gasoline into the tanks of automobiles, trucks and the like. These nozzles are of a flexible character whereby to more readily adjust them in place with little or no chance for spilling gasoline over the outside of the tank, or car. In the manufacture of these nozzles flexible tubing is used and this is provided with a body or coupling element for attaching it to the end of the supply hose. As the flexible tube is of much shorter life than the coupling, it will be seen that when this flexible tubing is no longer usable, under present arrangement, it is necessary to discard the entire nozzle, tubing and coupling together, which is a considerable expense where many of these nozzles are used. It is the object of my invention to provide a coupling element which can be used on the supply hose and to which the flexible nozzles can be interchangeably attached, thus making it possible to discard the minimum of material when it is necessary to replace a nozzle with a new one. I accomplish this by providing the flexible tube, constituting the nozzle, with a simple attaching element adapted to be secured to a coupling element, which in turn is attached to the supply hose, and which can be used indefinitely and with many different nozzles.

In order to explain my invention, I have shown on the accompanying sheet of drawings a nozzle embodying my invention, which I will now describe.

Figure 1 is a side elevation of a nozzle, embodying my invention, partly in section, and showing the coupling element disconnected from the flexible tube nozzle;

Figure 2 is a detail of attaching or supporting element for nozzles; and

Figure 3 is a view showing the nozzle and supply hose of a gasoline pump.

Figure 4 is a fragmentary view, partly in section, showing a modified form of my invention.

Referring in detail to the drawings, 1, designates a short section of flexible tubing, commonly used for nozzles of this character. It is provided on its outer end with a metal cap, 2, to protect the end thereof and to keep it from separating. I have also provided said flexible tube with two rings, as 3, 3, to prevent the nozzle from accidentally slipping from the tank opening, said rings catching on the inside of the edge of the tank, as will be readily understood, and thus preventing the nozzle from slipping out under the weight of the supply hose, designated 4, and shown in Fig. 3 of the drawings.

In the usual construction of these nozzles, said flexible tubing 1 is provided with a coupling which is attached to the tubing and is also capable of being attached to the supply hose 4, and when the nozzle is worthless, the coupling must be discarded with it. I have provided a flexible tube 1, with an attaching element 5, and a coupling element 6. In the form of the invention shown in Fig. 1, the attaching element is threaded, as at 5ª, and is adapted to be screwed into the coupling element 6, with a gasket, 7, therein, as shown. Said coupling element 6, is also provided with a second gasket, 8, and threaded to be attached to the supply hose, 4, as will be readily understood. It will be clear that the flexible tube 1, can be provided with a simple attaching element by means of which and in different ways it can be detachably secured to a coupling member for attachment to the end of a supply hose. As a means for supporting the end of the supply hose and the nozzle, it is provided with a hook element, 9, detachably secured thereto, as shown, or it can be provided with a loop, or eyelet, 10, shown in Fig. 2, for use in supporting the nozzle on the service pump, as indicated in Fig. 3.

In Fig. 4, I have illustrated a slightly modified form or embodiment of my invention, in which the flexible tube, 11, is provided with an attaching element, 12, having the annular flange, 13, while a coupling member, 14, is provided with an inner annular shoulder, 14ª, against which said flange, 13, bears when said flexible tube 11, and its attaching element 12, have been inserted through said coupling member, 14, as shown. Only one end of said coupling member is threaded, as at 14′, to receive the supply hose in the usual manner, with a gasket 15 therein. On the side of the coupling member 14, is a lug, 16, to which is attached a hook, 17, and also a ring, 18, either of which can be supplied and used, as desired. This makes a simple, practical and efficient nozzle coupling in which the coupling member 14, can be used with different nozzles, or flexible tubes, thus making it possible to supply the simple flexible tube nozzle with its attaching element 12, without supplying the entire coupling member.

I do not limit my invention to the showing as to details, except as I may be limited by the hereto appended claims.

I claim:

1. A nozzle of the character referred to including in combination, a flexible tube provided at one end with attaching means, a coupling member for detachably securing said flexible tube to a supply hose, and a supporting element on said coupling member, said coupling member being interchangeable with different flexible tubes, whereby the latter can be discarded when worn out without loss of said coupling member.

2. A nozzle of the character referred to including in combination, a flexible tube having intermediate its ends a nonslip ring element and provided at one end with simple attaching means, a coupling member for detachably securing said flexible tube to a hose, and a supporting element detachably secured to said coupling member, said coupling member being interchangeable with different flexible tubes, whereby the latter can be discarded when worn out without loss of said coupling member.

3. A hose nozzle including in combination, a section of flexible tubing provided at one end with a relatively small attaching element and means intermediate its ends to prevent it slipping from an opening into which it has been inserted, a coupling member for detachably securing said flexible tubing to a hose, said coupling member being interchangeable with different flexible tubings and having means for having detachably secured thereto a supporting element, and a supporting element detachably secured to said coupling member, said coupling member being usable with different supporting elements, whereas the wearing out of said flexible tubing and the loss of a supporting element does not discard the coupling element.

4. In combination, a section of flexible tubing, a coupling member for securing it detachably to a hose, said coupling member having a lug formed thereon, and a hook detachably secured to said lug for supporting said coupling member and flexible tubing, said coupling member being interchangeable with new flexible tubes when one is worn out.

Signed at Los Angeles, Los Angeles county, California, this 24th day of September, 1924.

GERALD J. HARMAN.